United States Patent [19]
Yokooku

[11] 4,428,355
[45] Jan. 31, 1984

[54] EXHAUST GAS RECIRCULATION CONTROL FOR INTERNAL COMBUSTION ENGINES

[75] Inventor: Katsuhiko Yokooku, Hiroshima, Japan

[73] Assignee: Toyo Kogyo Co., Ltd., Hiroshima, Japan

[21] Appl. No.: 390,767

[22] Filed: Jun. 21, 1982

[30] Foreign Application Priority Data

Jun. 22, 1981 [JP] Japan ................... 56-97128
Jun. 22, 1981 [JP] Japan ................... 56-97129

[51] Int. Cl.³ .......................................... F02M 25/06
[52] U.S. Cl. ........................... 123/571; 123/569; 123/479
[58] Field of Search ............ 123/571, 568, 569, 479

[56] References Cited

U.S. PATENT DOCUMENTS

3,779,222 12/1973 Lorenz ........................ 123/568
3,875,913 4/1975 Price ............................ 123/571
3,915,134 10/1975 Young et al. .
3,991,846 11/1976 Chichester et al. .
4,233,947 11/1980 Abo ............................ 123/571

FOREIGN PATENT DOCUMENTS

53-10752 2/1977 Japan .
1499273 1/1978 United Kingdom .

*Primary Examiner*—Wendell E. Burns
*Attorney, Agent, or Firm*—Fleit, Jacobson, Cohn & Price

[57] ABSTRACT

An internal combustion engine having an exhaust gas recirculation system provided with a recirculation control valve. An abnormality detecting circuit is provided to detect that the control valve is held open beyond a desired position position for more than a certain time due for example to a stick in the valve actuating mechanism so as to increase a charge of intake mixture in an idling operation or shutt-off the exhaust gas recirculation.

8 Claims, 5 Drawing Figures

EXHAUST GAS RECIRCULATION CONTROL FOR INTERNAL COMBUSTION ENGINES

The present invention relates to control means for internal combustion engines having exhaust gas recirculation means.

Conventionally, exhaust gas recirculation systems have widely been adopted in internal combustion engines for recirculating a part of exhaust gas from exhaust systems to intake systems to thereby suppress creation of nitrogen oxides. In such exhaust gas recirculation systems, it has been a common practice to provide an exhaust gas recirculation passage with a recirculation control valve so that the amount of exhaust gas recirculated to the engine intake system can be controlled in accordance with the operating condition of the engine. In order to ensure that the most suitable amount of exhaust gas be recirculated to the intake system, various proposals have been made. For example, the U.S. Pat. No. 3,915,134 discloses an exhaust gas recirculation control system having an electronic controller which is adapted to receive inputs from an recirculation control valve position sensor and one or more engine condition sensors for producing an output which is used to control the position of the recirculation control valve. The engine condition sensors are for measuring the engine load and the engine speed. Japanese patent application 52-21561 filed on Mar. 2, 1977 and disclosed for public inspection on Sept. 19, 1978 under the disclosure number 53-107526 also discloses an exhaust gas recirculation control system based on a similar concept.

In such conventional exhaust gas recirculation systems, however, there has been a problem in that the recirculation control valve may possibly be held in an open position due to a stick in the valve actuating mechanism or an erroneous operation of the electronic control circuit so that an excessive amount of exhaust gas be recirculated to the intake system causing a poor engine operation.

It is therefore an object of the present invention to provide an engine exhaust gas recirculation system in which the aforementioned problems have been solved.

Another object of the present invention is to provided an engine exhaust gas recirculation system with means for detecting that the control valve is held in an open position to thereby effect a control for facilitating combustion in the engine.

According to the present invention, the above and other objects can be accomplished by an internal combustion engine including combustion chamber means, intake passage means leading to said combustion chamber means for providing a supply of intake gas thereto, exhaust passage means communicating with said combustion chamber means for passing exhaust gas from the combustion chamber means, exhaust gas recirculating passage means extending between said exhaust and intake passage means for recirculating a part of exhaust gas in the exhaust passage means to the intake passage means, exhaust gas recirculation control valve means for controlling amount of exhaust gas passing through the recirculation control passage means, valve control means for controlling said valve means in accordance with at least one engine operating condition to thereby control the amount of recirculated exhaust gas, abnormality detecting means for detecting that the valve means is erroneously held in an open position to produce an output signal, corrective means adapted to receive said output signal from the detecting means for improving combustive property of the engine. The corrective means may include intake gas charge increasing means which is adapted to receive said output signal from the detecting means and increase flow of the intake gas to the combustion chamber means in an idling operation of the engine. Alternatively, the intake gas may be enriched when the output signal is received. In an alternative aspect of the present invention, the corrective means includes shut-off valve means provided in the recirculation passage means and valve drive means responsive to said output signal from the detecting means to close the shut-off valve means. In a further aspect of the present invention, the corrective means includes means responsive to said output signal from the detecting means for advancing ignition timing so that a stable engine operation is ensured even under an excessive recirculation of the exhaust gas.

The valve control means may include valve position detecting means for detecting position of said control valve means to produce a valve position signal, engine operating condition detecting means for detecting at least one engine operating condition to produce an engine condition signal, valve position setting means responsive to said engine condition signal for producing a desired position signal which represents a desired control valve position, comparing means for comparing the valve position signal with said desired position signal and producing a valve operating signal for operating the control valve means so that the position of the control valve means is approached to the appropriate control valve position; said abnormality detecting means including deviation detecting means for detecting that the control valve means is opened beyond the desired control valve position for more than a predetermined time and producing said output signal.

The above and other objects and features of the present invention will become apparent from the following descriptions of preferred embodiments taking reference to the accompanying drawings, in which.

Figure 1:
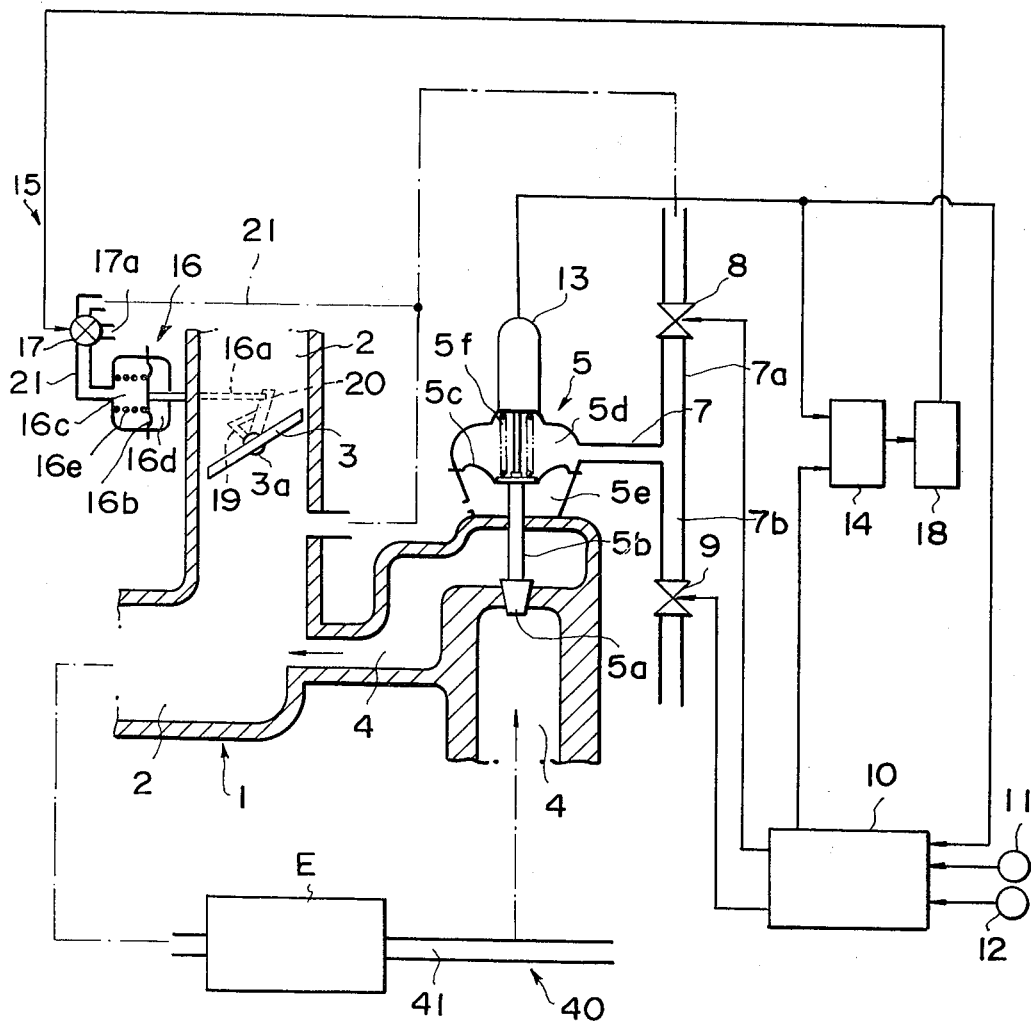
FIG. 1 is a schematic sectional view of an engine exhaust gas recirculation system in accordance with one embodiment of the present invention.

Referring now to the drawings, particularly to FIG. 1, there is schematically shown an engine E having a suitable number of combustion chambers and an intake system 1 having an intake passage 2 connected with the combustion chambers. The engine E also has an exhaust system 40 comprising an exhaust passage 41 leading from the combustion chambers.

In the intake passage 2, there is provided a throttle valve 3 which is mounted through a valve shaft 3a. The valve shaft 3a is connected with a conventional throttle valve actuating mechanism (not shown) so that the throttle valve 3 is actuated manually as well known in the art. Between the intake passage 2 and the exhaust passage 41, there is an exhaust gas recirculation passage 4 which opens at one end to the exhaust passage 41 and at the other end to the intake passage 2 downstream of the throttle valve 3. In the recirculation passage 4, there is provided an exhaust gas recirculation control valve 5 comprising a valve member 5a formed at one end of a valve stem 5b which is connected at the other end with a diaphgram 5c. The diaphragm 5c defines a suction pressure chamber 5d at one side and an atmospheric pressure chamber 5e at the other side. In the suction pressure chamber 5d, there is a spring 5f which functions to force the diaphragm 5c and therefore the valve member 5a toward a closed position. The suction pressure chamber 5d is connected with a suction pressure passage 7 which is opened through a branch passage 7a to the intake passage 2 downstream of the throttle valve 3 and through a branch passage 7b to the atmosphere. In the passage 7a, there is provided a suction pressure solenoid valve 8. Similarly, the passage 7b is provided with an atmospheric pressure solenoid valve 9. Thus, by controlling the solenoid valves 8 and 9 appropriately, it is possible to determine the suction pressure in the chamber 5d to thereby determine the opening of the recirculation control valve 5.

In order to control the position of the recirculation control valve 5, there is provided a control circuit 10 which receives input signals from an engine speed sensor 11, an engine load sensor 12 and a valve position detector 13. As shown in FIG. 1, the valve position dectector 13 is provided on the control valve 5 and produces a valve position signal in accordance with the position of the diaphragm 5c. The control circuit 10 produces outputs which are applied to the solenoid valves 8 and 9 to control the same. The engine load sensor 12 may be of a type that detects the suction pressure in the intake passage 2.

The throttle valve shaft 3a has an abutting member 19 which is secured thereto. An idle stop lever 20 is loosely mounted on the shaft 3a and connected through a push-pull rod 16a with an actuator 16. The actuator 16 includes a diaphragm 16b which defines a suction pressure chamber 16c and an atmospheric pressure chamber 16d. In the suction pressure chamber 16c, there is a spring 16e which forces the diaphragm 16b and therefore the idle stop lever 20 toward a position wherein the idle opening of the throttle valve 3 is decreased. The suction pressure chamber 16c is connected through a passage 21 with the intake passage 2 downstream of the throttle valve 3. The passage 21 is provided with a three position solenoid valve 17 having a vent port 17a so that when it is energized the intake suction pressure is introduced into the chamber 16c to thereby increase the idle opening of the throttle valve 13.

Figure 2:
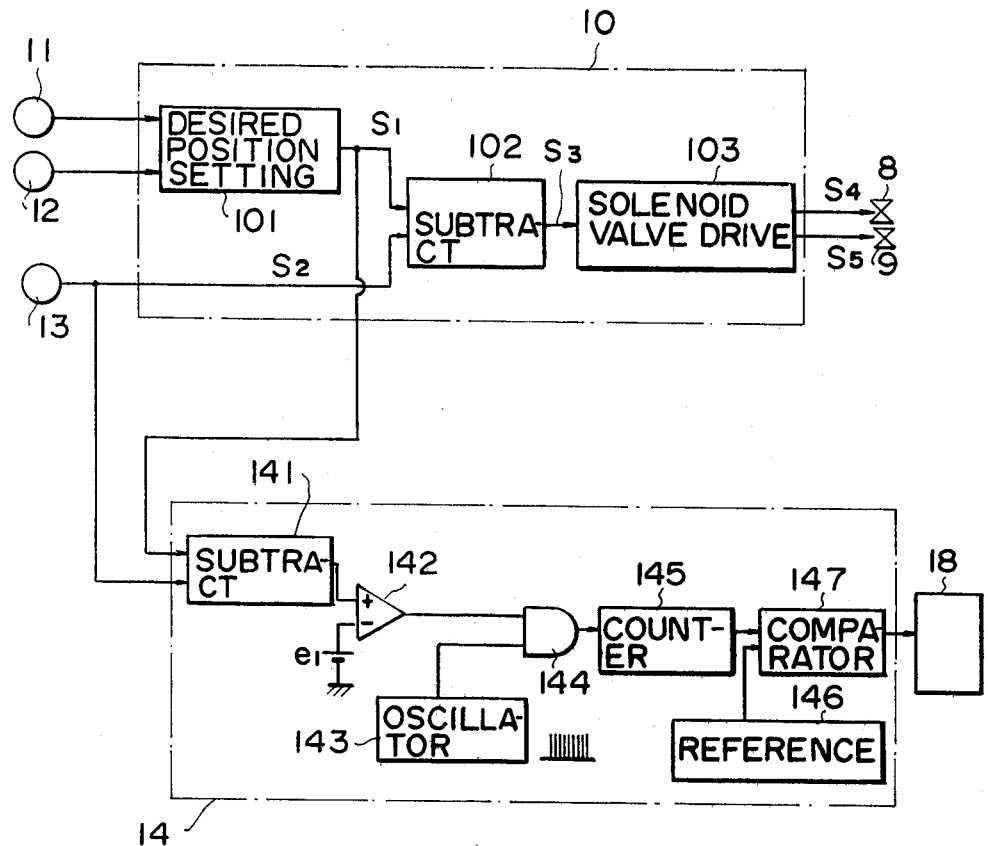
FIG. 2 is a block diagram showing the details of the controller used in the recirculation system of FIG. 1.
Figure 3:
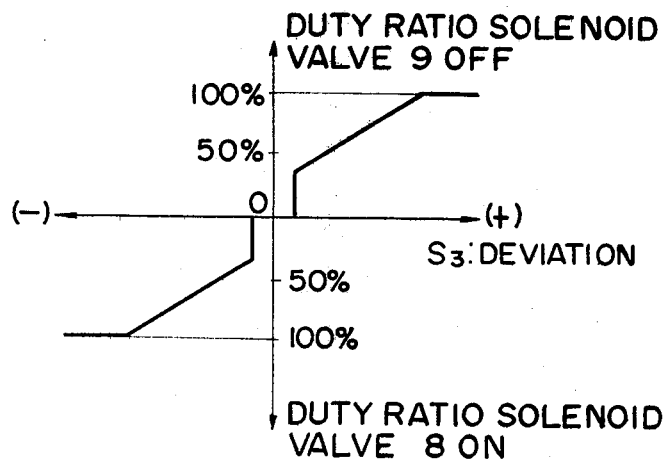
FIG. 3 is a diagram showing the control of solenoid valves.

Referring now to FIG. 2, it will be noted that the control circuit 10 includes a valve position setting circuit 101 which is connected with the outputs of the engine speed sensor 11 and the engine load sensor 12 so as to produce an output $S_1$ which corresponds to a desirable valve position under a specific engine speed and a specific engine load. The output $S_1$ of the circuit 101 is applied to a subtracting circuit 102 which also receives a valve position signal $S_2$ from the valve position detector 13 to produce a deviation signal $S_3$ which corresponds to a difference between the desirable valve position and the actual valve position. The deviation signal $S_3$ is applied to a solenoid valve driving signal generating circuit 103 which produces signals $S_4$ and $S_5$ adapted to be applied to the solenoid valves 8 and 9 respectively. The solenoid valve 8 is normally closed and opened when energized. The solenoid valve 9 is, by the contrary, normally open and closed when energized. As shown in FIG. 3, when the actual valve opening is larger than the desired opening, the solenoid valve 9 is de-energized to open the passage 7b so that the suction pressure in the chamber 5d of the control valve 5 is weakened. Thus, the opening of the control valve 5 is decreased. The duty ratio, that is, the fraction of a unit time in which the solenoid valve 9 is de-energized is increased in response to an increase in the deviation.

Similarly, when the actual valve opening is smaller than the desired opening, the solenoid valve 8 is energized to open the passage 7a so that the suction pressure in the chamber 5d is strengthened. Thus, the opening of the control valve 5 is increased. The duty ratio, that is, the fraction of a unit time in which the solenoid valve 8 is energized is increased in response to an increase in the deviation. With this control circuit 10, it is therefore possible to control the exhaust gas recirculation appropriately in accordance with the engine speed and engine load.

The exhaust gas recirculation control system further includes an abnormality detecting circuit 14 which includes a subtracting circuit 141 similar to the circuit 102. The circuit 141 is applied with the signal $S_1$ from the circuit 101 and the valve position signal from the detector 13 and produces a deviation signal which is applied to a comparator 142. The comparator 142 functions to compare the deviation signal from the circuit 141 with a predetermined voltage $e_1$ and produce a high level output when the deviation signal is greater than the voltage $e_1$. The output of the comparator 142 is applied to an AND circuit 144 which is also applied with pulses produced by an oscillator 143. Thus, the AND circiut 144 produces a series of pulse signals as far as the high level signal is received from the comparator 142. The pulse signals from the AND circuit 144 is applied to a digital counter 145 and the output of the counter 145 is applied to a digital comparator 147. The comparator 147 functions to compare the output of the counter 145 with a reference value applied from a reference circuit 146 and, when the output of the counter 145 becomes larger than the reference value, the comparator 147 produces an output which is applied to a driving circuit 18. The driving circuit 18 thus applies a current to the solenoid valve 17 to energize the same so that the intake suction pressure is introduced into the chamber 16c of the actuator 16 to thereby increase the idle opening of the throttle valve 3. It will therefore be understood that, when the recirculation control valve 5 is opened beyond a desired position for a predetermined time due for example to a stick in the valve actuating mechanism, the idle opening of the throttle valve 3 is increased and the charge of the intake gas is therefore increased. Thus, it is possible to ensure a stable operation even under an excessively large recirculation of the exhaust gas.

Figure 4:
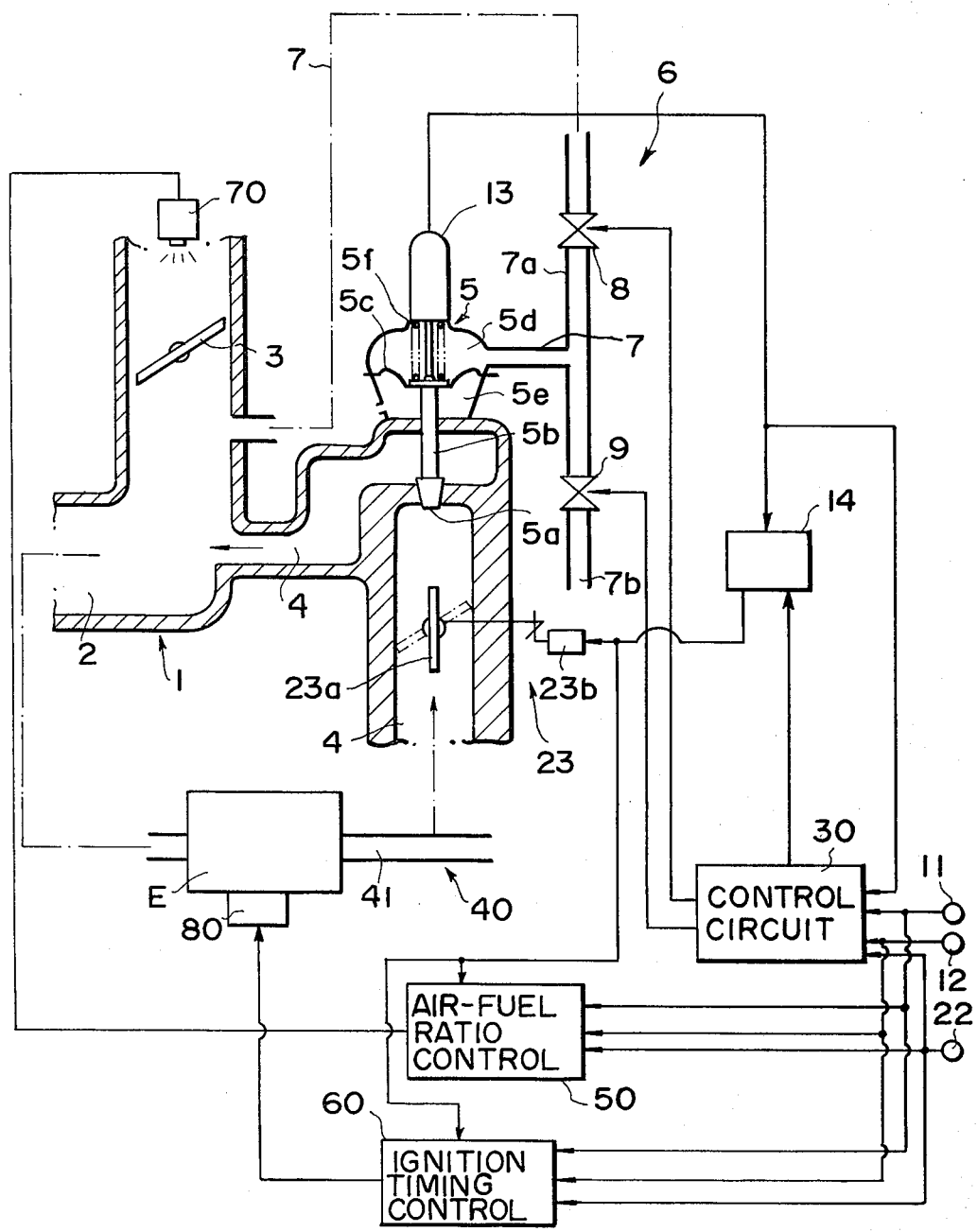
FIG. 4 is a view similar to FIG. 1 but showing another embodiment.

Referring now to FIG. 4, the engine shown therein is basically the same as in the previous embodiment so that corresponding parts are shown by the same reference numerals. In this embodiment, the recirculation passage 4 is provided with a recirculation shut-off mechanism 23 comprised of a shut-off valve 23a and an actuator 23b for actuating the same. In the intake passage 2, there is provided a fuel injection valve 70 which is controlled by an air-fuel ratio regulating circuit 50. The circuit 50 receives input signals from an engine speed sensor 11, an engine load sensor 12 and an engine temperature sensor 22 to determine an appropriate air-fuel ratio of the intake mixture in accordance with the engine operating condition.

The engine has an ignition device 80 which is controlled by an ignition timing control circuit 60. The circuit 60 receives input signals from the sensors 11, 12 and 22 to thereby determine appropriate ignition timing in accordance with the engine operating condition.

Figure 5:
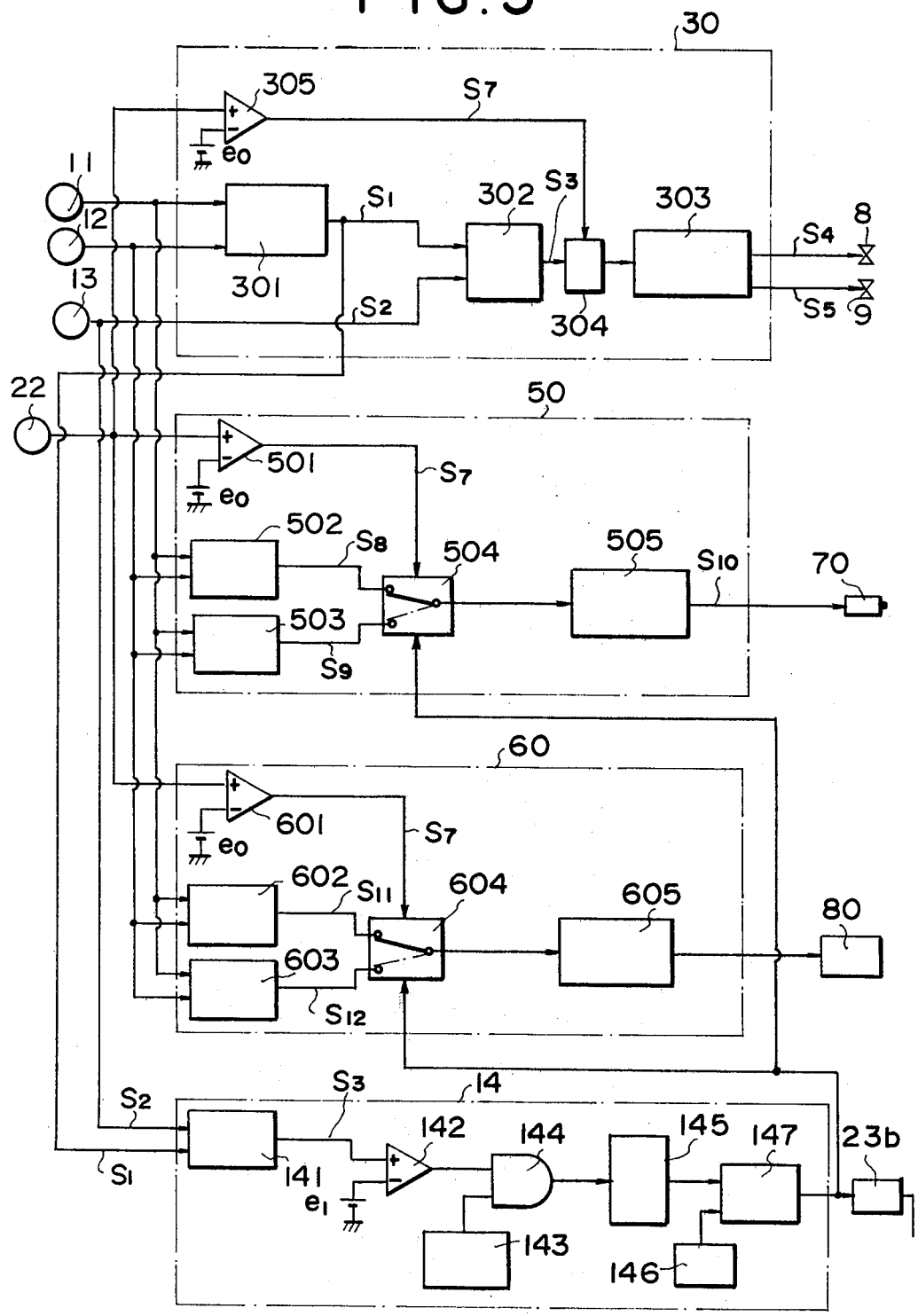
FIG. 5 is a block diagram of the controller used in the system shown in FIG. 4.

In this embodiment, the solenoid valves 8 and 9 for controlling the suction pressure in the chamber 5d of the recirculation control valve 5 are operated by electric currents from a control circuit 30 which receives input signals from the sensors 11, 12 and 22 and the valve position detector 13. Referring to FIG. 5, the control circuit 30 includes a desired opening setting circuit 301 which receives the engine speed signal and engine load signal from the sensors 11 and 12, respectively, to produce a desired valve position signal $S_1$. The signal $S_1$ is applied to a subtracting circuit 302 which is also applied with an actual valve position signal $S_2$ from the detector 13. The circuit 302 produce a deviation signal $S_3$ which represents a deviation of the actual control valve position from a desired position. The deviation signal $S_3$ is applied to a gate circuit 304.

The control circuit 30 further includes a comparator 305 which functions to compare the engine temperature signal with a reference voltage $e_0$ and, when the engine temperature is above a predetermined value, it produces a high level signal $S_7$ which is applied to the gate circuit 304. The gate circuit 304 is opened to pass the deviation signal $S_3$ to a solenoid valve driving circuit 303 when the signal $S_7$ is applied from the comparator 305. The solenoid valves 8 and 9 are actuated as in the previous embodiment.

The air-fuel ratio regulating circuit 50 includes a first fuel injection time setting circuit 502 and a second fuel injection time setting circuit 503 which receive engine speed and engine load signals from the sensors 11 and 12. The circuit 502 functions to produce an output signal $S_8$ which determines a fuel injection time suitable for providing an appropriate air-fuel ratio under an engine operation without exhaust gas recirculation. Similarly, the circuit 503 produces an output signal $S_9$ for determining a fuel injection time for an engine operation under exhaust gas recirculation. The signals $S_8$ and $S_9$ are applied to a switching circuit 504 which is controlled by a signal from a comparator 501. The comparator 501 functions to compare the engine temperature signal from the sensor 22 with a reference voltage $e_0$ and produces a signal $S_7$ when the engine temperature is above the aforementioned predetermined value. The signal $S_7$ is applied to the switching circuit 504 so that the air-fuel ratio signal $S_9$ from the circuit 503 is passed through the circuit 504. The output of the switching circuit 504 is applied to a driving circuit 505 which produces a fuel injection signal $S_{10}$ for opening the fuel injection valve 70 for a time determined by the signal from the switching circuit 504. When the engine temperature is below the aforementioned predetermined value, the air-fuel ratio signal $S_8$ is passed to the driving circuit 505 so that a leaner air-fuel mixture is provided for an operation without exhaust gas recirculation.

The ignition timing control circuit 60 includes a first timing setting circuit 602 and a second timing setting circuit 603. The circuit 602 produces an output signal $S_{11}$ for determining an ignition timing suitable for engine operation without exhaust gas recirculation. Similarly, the circuit 603 produces an output signal $S_{12}$ for determining an ignition timing suitable for an engine operation under exhaust gas recirculation. The signals $S_{11}$ and $S_{12}$ are applied to a switching circuit 604 controlled by a signal $S_7$ from a comparator 601 which is identical to the comparators 305 and 501. Thus, when the engine temperature is above the aforementioned predetermined value, the signal $S_7$ is applied to the switching circuit 604 to make the circuit 604 pass the ignition timing signal $S_{12}$ from the circuit 603. The output from the switching circuit 604 is applied to a driving circuit 605 which controls the ignition device 80 in accordance with the signal passed through the switching circuit 604. When the engine temperature is below the predetermined value, the ignition timing signal $S_{11}$ is passed to the driving circuit 605 so as to retard the ignition timing for an engine operation without exhaust gas recirculation.

The abnormality detecting circuit 14 includes a subtracting circuit 141 which is similar to the circuit 302 in the control circuit 30. The circuit 141 receives a desired valve position signal $S_1$ from the setting circuit 301 and an actual valve position signal $S_2$ from the detector 13 to produce a deviation signal $S_3$. As in the previous embodiment, the deviation signal $S_3$ is compared in a comparator 142 with a reference voltage $e_1$. The arrangements of the abnormality detecting circuit 14 are the same as in the previous embodiment so that descriptions will not be made further. The output of the circuit 14 is applied to the shut-off valve actuator 23b to close the shut-off valve 23a. Thus, the exhaust gas recirculation passage 4 is closed to shut off the gas recirculation when the recirculation control valve is opened beyond a desired position for a predetermined time. At the same time, the output of the circuit 14 is applied to the switching circuits 504 and 604 to turn over the circuits 504 and 604 so that the air-fuel ratio signal $S_8$ from the circuit 502 and the ignition timing signal $S_{11}$ from the circuit 602 are passed to the driving circuits 505 and 605, respectively. Thus, suitable air-fuel ratio and ignition timing can be determined for an engine operation without exhaust gas recirculation.

From the above descriptions, it will be understood that in this embodiment the gate circuit 304 is closed under an engine temperature below the aforementioned predetermined value so that the solenoid valves 8 and 9 are de-energized and the chamber 5d in the recirculation control valve 5 is opened to the atmosphere through the passage 7b. Thus, the valve member 5a is held in the closed position and the engine is operated without the exhaust gas recirculation. This is desirable to ensure a stable engine operation under a low engine temperature. In this instance, the switching circuits 504 and 604 are in such positions that the air-fuel ratio signal $S_8$ from the circuit 502 and the ignition timing signal $S_{11}$ from the circuit 602 are passed to the driving circuits 505 and 605, respectively. Thus, the engine is supplied with an intake mixture of a leaner air-fuel ratio suitable for operation without the exhaust gas recirculation. Further, the ignition timing is controlled so that the ignition takes place at relatively retarded timings for the engine operation without the exhaust gas recirculation.

As the engine temperature increases beyond the predetermined value, the gate circuit 304 is opened by the signal $S_7$ applied from the comparator 305. Thus, the solenoid valves 8 and 9 are controlled under the deviation signal $S_3$ as in the previous embodiment. At the same time, the signals $S_7$ are applied to the switching circuits 504 and 604 from the comparators 501 and 601, respectively, to turn over the switching circuits. The driving circuit 505 is therefore applied with the signal $S_9$ from the circuit 503 to increase the time in which the injection valve 70 is opened. Thus, the air-fuel mixture to the engine is enriched for operation with exhaust gas recirculation. Similarly, the driving circuit 605 is applied with the signal $S_{12}$ from the circuit 603 so that the ignition timing is advanced.

When it is found that the exhaust gas recirculation control valve 5 is held in an open position beyond a desired position for a predetermined time, the abnormality detecting circuit 14 produces an output to thereby close the shut-off valve 23a in the recirculation passage 4. At the same time, the output of the circuit 14 is applied to the switching circuits 504 and 604 to turn over the same. Thus, the air-fuel ratio signal $S_8$ from the circuit 502 is applied to the driving circuit 505 so that a leaner air-fuel mixture is supplied to the engine. Further, the ignition timing signal $S_{11}$ from the circuit 602 is applied to the driving circuit 605 so that the ignition timing is retarded.

It should be noted that in the embodiments described above the control circuit 10 and the abnormality detecting circuit 14 in the first embodiment, or the circuits 30, 50, 60 and 14 in the second embodiment may be substituted by a micro-computor.

The invention has thus been shown and described with reference to specific embodiments, however, it should be noted that the invention is in no way limited to the details of the illustrated arrangements but changes and modifications may be made without departing from the scope of the appended claims.

I claim:

1. An internal combustion engine including combustion chamber means, intake passage means leading to said combustion chamber means for providing a supply of intake gas thereto, exhaust passage means communicating with said combustion chamber means for passing exhaust gas from the combustion chamber means, exhaust gas recirculating passage means extending between said exhaust and intake passage means for recirculating a part of exhaust gas in the exhaust passage means to the intake passage means, exhaust gas recirculation control valve means for controlling amount of exhaust gas passing through the recirculation control passage means, valve control means for controlling said valve means in accordance with at least one engine operating condition to thereby control the amount of recirculated exhaust gas, abnormality detecting means for detecting that the valve means is erroneously held in an open position to produce an output signal, corrective means adapted to receive said output signal from the detecting means for improving combustive property of the engine.

2. An engine in accordance with claim 1 in which said corrective means includes intake gas charge increasing means which is adapted to receive said output signal from the detecting means and increase flow of the intake gas to the combustion chamber means in an idling operation of the engine.

3. An engine in accordance with claim 1 in which said corrective means includes shut-off valve means provided in the recirculation passage means and valve drive means responsive to said output signal from the detecting means to close the shut-off valve means.

4. An engine in accordance with claim 1 in which said valve control means includes valve position detecting means for detecting position of said control valve means to produce a valve position signal, engine operating condition detecting means for detecting at least one engine operating condition to produce an engine condition signal, valve position setting means responsive to said engine condition signal for producing a desired position signal which represents a desired control valve position, comparing means for comparing the valve position signal with said desired position signal and producing a valve operating signal for operating the control valve means so that the position of the control valve means is approached to the appropriate control valve position; said abnormality detecting means including deviation detecting means for detecting that the control valve means is opened beyond the desired control valve position for more than a predetermined time and producing said output signal.

5. An internal combustion engine comprising combustion chamber means, intake passage means leading to said combustion chamber means, exhaust passage means leading from said combustion chamber means, exhaust gas recirculation passage means connecting said exhaust passage means with said intake passage means for passing a part of exhaust gas from said exhaust passage means to said intake passage means, exhaust gas recirculation control valve means provided in said recirculation passage means for controlling amount of the exhaust gas flowing through the recirculation passage means, control valve actuating means for actuating said control valve means to provide a desirable opening in said recirculation passage means in accordance with engine operating condition, abnormality detecting means to detect that said control valve means is held in an open position beyond a desired position for more than a predetermined time and produce an abnormality signal, shut-off valve means provided in said recirculation passage means, shut-off valve actuating means responsive to said abnormality signal for closing said shut-off valve means to shut-off exhaust gas recirculation.

6. An engine in accordance with claim 5 which further includes compensating means responsive to said abnormality signal to control at least one of air-fuel ratio of intake mixture and ignition timing to a value suitable for an engine operation without exhaust gas recirculation.

7. An engine in accordance with claim 6 which includes air-fuel ratio control means comprising first air-fuel ratio setting means for providing a first air fuel ratio signal corresponding to a leaner air-fuel ratio suitable to an engine operation without exhaust gas recirculation, second air-fuel ratio setting means for providing a second air-fuel ratio signal corresponding to a richer air-fuel ratio suitable to an engine operation with exhaust gas recirculation, said compensating means including switching means for normally selecting said second air-fuel ratio signal but responsive to said abnormality signal to select said first air-fuel ratio signal.

8. An engine in accordance with claim 6 which includes ignition timing control means comprising first ignition timing setting means for providing a first ignition timing signal corresponding to a retarded timing suitable for an engine operation without exhaust gas recirculation, said ignition timing setting means for providing a second ignition timing signal corresponding to an advanced timing suitable for an operation with exhaust gas recirculation, said compensating means including switching means for normally selecting said second ignition timing signal but responsive to said abnormality signal to select said first ignition timing signal.

* * * * *